Patented Mar. 16, 1937

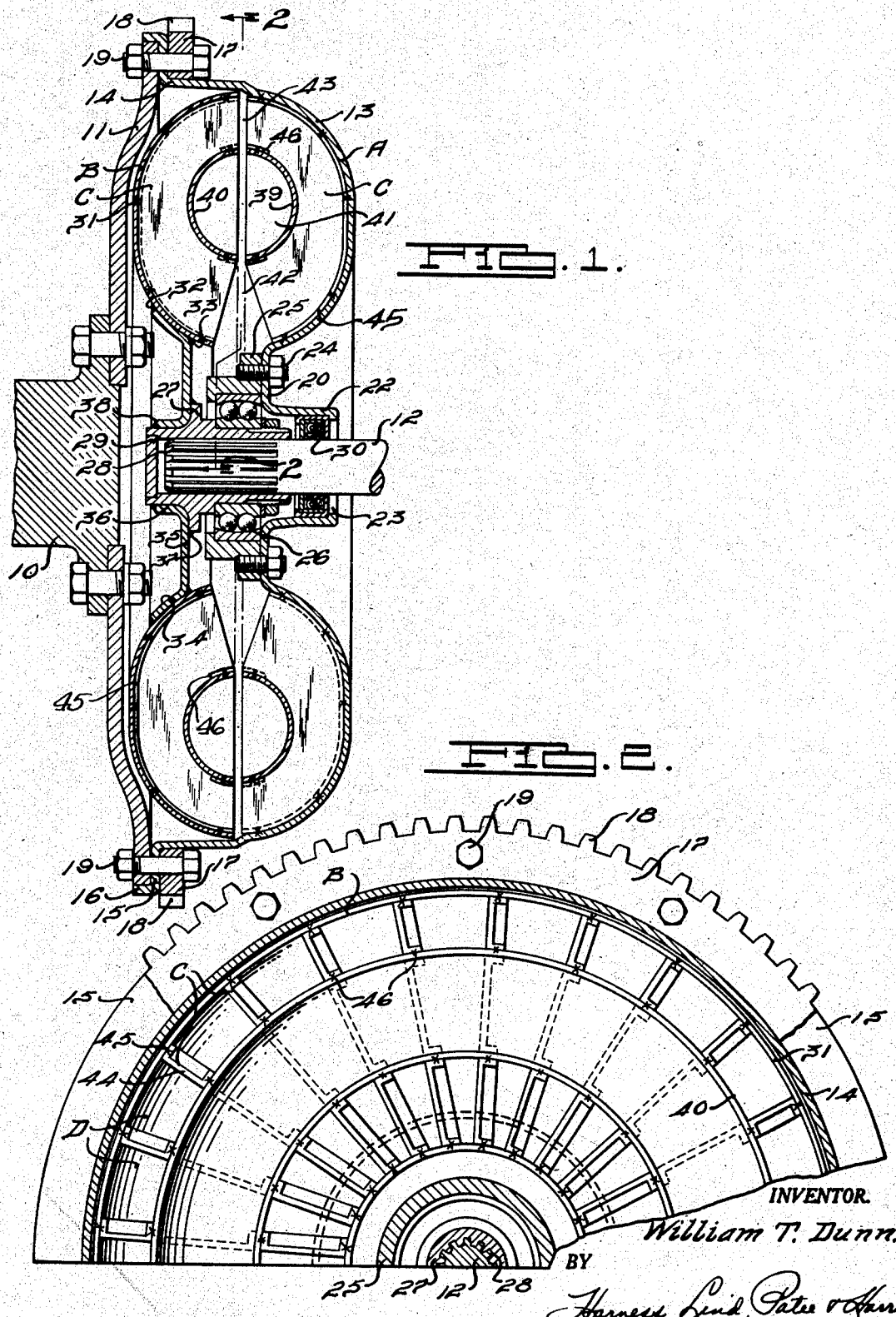

2,074,170

UNITED STATES PATENT OFFICE 2,074,170

POWER TRANSMITTING DEVICE

William T. Dunn, Detroit, Mich., assignor to Chrysler Corporation, Highland Park, Mich., a corporation of Delaware Original application May 14, 1934, Serial No. 725,572. Divided and this application March 14, 1935, Serial No. 11,056

2 Claims. (Cl. 60—54)

This invention relates to power transmitting devices and refers more particularly to fluid couplings, clutches, drives and the like.

It is an object of my invention to provide an improved fluid coupling capable of manufacture at relatively low cost and light weight without sacrificing the desired requisite strength and resistance to objectionable distortion.

This application is a division of my co-pending application Serial No. 725,572, filed May 14, 1934.

A further object of my invention is to provide improved means, particularly from standpoints of low cost and ease of manufacture, for attaching the impeller member of the fluid coupling to the power driving means, my invention making it possible to largely form the parts of the drive from stampings. Where the impeller is attached to the flywheel of an internal combustion engine, such arrangement being customary where the fluid coupling is used to transmit the power to motor vehicles, I have provided improved means for mounting the engine flywheel starting gear ring in the assembly which includes the engine flywheel and the impeller.

Further objects and advantages of my invention will be apparent from the following detailed illustrative embodiment of the principles of my invention, reference being had to the accompanying drawing, in which:

Fig. 1 is a sectional elevational view axially through my improved coupling.

Fig. 2 is an elevational view, partly in section, showing a typical portion of the runner, the view being taken along the line 2—2 of Fig. 1.

In the drawing, reference character A represents the impeller of the fluid coupling and B designates the runner, the coupling being shown for illustrative purposes transmitting the drive from an engine crankshaft 10 and flywheel 11 carried thereby to a driven shaft 12 which may be connected to the driving wheels (not shown) of a motor vehicle in the well-known manner. My coupling may, of course, be employed to provide a driving connection between the parts of various machines or devices and is not limited in its useful application to motor vehicle drives.

The impeller or rotor A has a stamped sheet metal vane carrying outer cover plate 13 dished as illustrated in Fig. 1 and extending around the axis of the fluid coupling assembly as provided by the aligned axes of crankshaft 10 and driven shaft 12. As will be more presently apparent, the outer cover plate 13 cooperates with the flywheel 11 to house the impeller and runner structures together with the fluid medium circulated therein, the outer cover plate 13 thereby forming the rear casing of the coupling.

The outer cover plate 13 is provided with a forwardly extending annular flange 14 bent outwardly at 15 into contact with the rear peripheral face of flywheel 11, the flange 15 terminating outwardly in a forwardly bent annular flange 16 engaging the periphery of flywheel 11. Fitting in the angular pocket provided by the flange 15 and the forwardly extending portion 14 is the ring 17 formed with the starter teeth 18 adapted for engagement with the usual engine starting device not illustrated herein but of well-known construction. It will be apparent that the starter ring gear 17 is separately formed from the flywheel 11, such construction permitting the flywheel to be formed of a stamping from relatively low-cost material lending itself readily to the stamping operation, the starter ring gear 17 being formed of a harder, higher-grade steel. The starter ring gear, outer cover plate 13 and flywheel 11 are rigidly secured together as a unitary construction by a circumferential series of fastening devices indicated at 19.

The cover plate 13 extends inwardly to provide an annular web portion 20 and then rearwardly to form the hub portion 22 having an opening 23 for receiving shaft 12. Suitably secured to web 20 as by fasteners 24 is a carrier ring 25 receiving the ball bearing assembly 26, the latter being supported by a hub 27 drivingly connected by splines or teeth 28 to shaft 12. A fluid seal 29 closes the forward opening of hub 27 to prevent passage and escape of the fluid medium from the coupling rearwardly along the shaft 12. A further fluid sealing assembly 30 surrounds the shaft 12 in contact with the hub portion 22 to prevent escape of the fluid medium through the opening 23. The seal 29 may be dispensed with, if desired, since in Fig. 1 the seal 30 engages the shaft 12.

From the foregoing it will be apparent that the impeller A is drivingly connected to flywheel 11 and is supported and centered on driven shaft 12 but rotatable independently thereof. The runner B is encased by the flywheel 11 and the outer cover plate 13 of impeller A, this casing being filled or partially filled with the fluid medium which may be oil, water, or other suitable fluid.

Before describing the generally similar details of the vane structure for the impeller and runner, it will be noted that the runner B has an oppositely dished cover plate 31 formed of a sheet metal stamping and adapted to carry the vanes of the runner as will be presently apparent.

This outer cover plate is suitably secured as by welding at 32, 33 to the annular flange 34 of the stamped disc 35, the latter having a forwardly bent flanged hub 36 suitably secured as by welding at 37, 38 to the aforesaid hub 27.

The impeller A is provided with the stamped sheet metal inner cover plate 39 spaced within the outer cover plate 13 and correspondingly dished, this inner cover plate extending ring-like about the axis of shaft 12, the inner cover plate being substantially semi-circular in cross section. The runner B is also provided with a similar inner cover plate 40 spaced within the outer cover plate 31, these inner cover plates 39 and 40 together forming a core guide ring and providing a vortex chamber 41 for the fluid which circulates between the impeller and runner around the vortex chamber as will be presently more apparent.

The rotors A and B may have vane forming structures of generally similar construction, the typical structure being best illustrated in Fig. 2 in connection with the runner B. Intermediate the inner and outer cover members 40 and 31, respectively, are located a series of circumferentially spaced stamped sheet metal vane forming members C which extend substantially radially from the low pressure chamber or zone 42 to the high pressure chamber or zone 43, these chambers being provided by circumferential clearance spaces between the oppositely facing portions of the impeller A and runner B.

The members C have radially extending vane portions 44 integrally formed with circumferentially extending outer and inner web or flange portions 45 and 46 respectively. Each web portion 45 is shaped to conform with the dished outer cover plate 31, the webs engaging the inner surface of this outer cover plate and being secured thereto by welding. In similar manner the inner webs 46 engage the inner cover plate 40 and are likewise secured thereto by welding. The welding may be in the form of a continuous weld radially along the abutting portions of the webs and cover plates or the welding may be at intermittent points as will be readily understood. The circumferential spacing of the vane forming members C provide circumferentially spaced fluid conducting passages D, these passages being open and communicating at their inner ends with the chamber 42 and at their outer ends communicating with the chamber 43.

The impeller A is likewise formed with the vane forming circumferentially spaced members C providing a series of similar fluid conducting passages likewise communicating with the chambers 42 and 43. After the parts have been assembled as illustrated in Figs. 1 and 2 and the space between the flywheel 11 and outer cover plate 13 has been filled or partially filled with the fluid medium, the impeller A will rotate with the driving flywheel to cause the fluid to circulate under the action of centrifugal force from space 42 outwardly through the impeller vane passages for discharge at the space 43 where the fluid enters the runner vane passages for discharge at the space 42. The runner is thus driven from the impeller and the slip between the parts rapidly diminishes as the speed of the impeller increases. It will be observed that the fluid space between the flywheel 11 and outer cover plate 13 and particularly the disclosure defined further by the disc 35 and hubs 27 and 25 are substantially free from projections, screws, bolts, etc., which produce noises and friction losses as the fluid is rapidly circulated within the coupling. Furthermore, it will be noted that the bounding faces of the fluid passages D will likewise provide for smooth flow of the fluid with resulting relatively high efficiency of power transmission; especially in providing for free slippage of the coupling at low speed.

Various modifications and changes will be readily apparent from the teachings of my invention, as set forth in the appended claims, and it is not my intention to limit my invention to the particular details of construction and operation shown and described for illustrative purposes.

What I claim is:

1. In a fluid coupling for driving and driven members, a flywheel structure drivingly secured to said driving member and having the major portion thereof disposed substantially in a plane generally perpendicular thereto, a casing structure, an impeller rotor driven with said casing structure, a runner rotor fixed to said driven member, said structures substantially enclosing said rotors, said casing structure having a flanged end, a portion of said flange abutting a side face of said flywheel structure, said flange having a terminal portion overlying the peripheral face of said flywheel, a ring gear adjacent said flanged end, and a common means for connecting together said flywheel, flanged end and ring gear.

2. In a fluid coupling for driving and driven shafts including driving and driven members operatively associated with said shafts; a housing for said members including a flywheel secured to said driving shaft and a casing adapted to be secured to said flywheel, said casing having a plurality of adjacent flanged portions including an annular flange, a radial flange extending outwardly from said annular flange and abutting a side face of said flywheel, and an annular flanged end contacting the outer peripheral face of said flywheel; a ring gear having its inner peripheral face contacting said annular flange and a side face contacting said radial flange; and common means for securing together said flywheel, ring gear and casing.

WILLIAM T. DUNN.